DE WITT W. BISBEE & P. A. CRESSEY.
TROLLEY COLLECTOR DEVICE.
APPLICATION FILED JAN. 2, 1917.
1,290,012.
Patented Dec. 31, 1918.
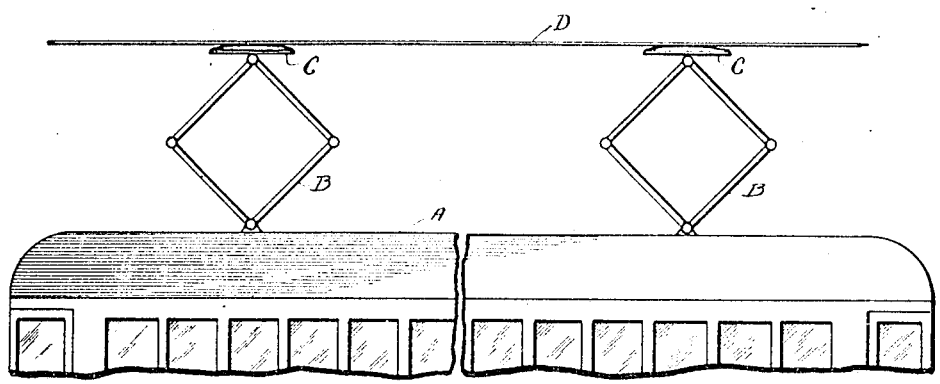
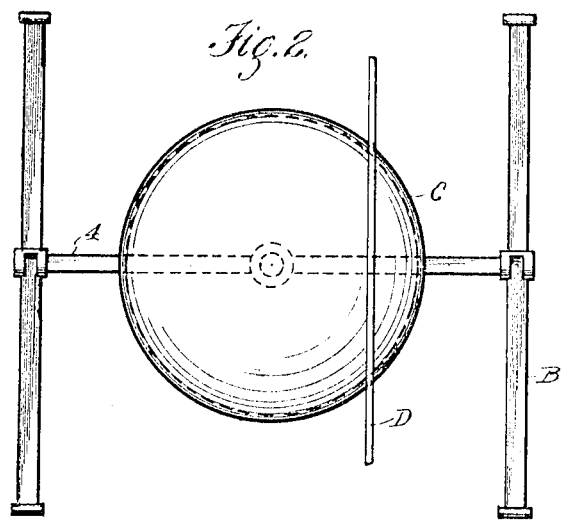
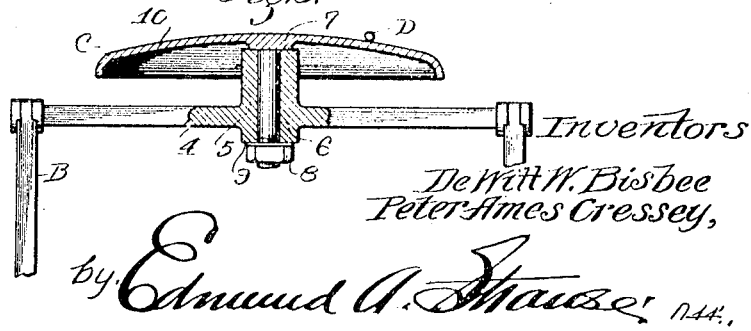

UNITED STATES PATENT OFFICE.

DE WITT W. BISBEE, OF LOS ANGELES, AND PETER AMES CRESSEY, OF LONG BEACH, CALIFORNIA.

TROLLEY-COLLECTOR DEVICE.

1,290,012.   Specification of Letters Patent.   Patented Dec. 31, 1918.

Application filed January 2, 1917. Serial No. 140,291.

*To all whom it may concern:*

Be it known that we, DE WITT W. BISBEE, a citizen of the United States, residing at Los Angeles, in the county of Los Angeles and State of California, and PETER AMES CRESSEY, a citizen of the United States, residing at Long Beach, county of Los Angeles, State of California, have invented new and useful Improvements in Trolley-Collector Devices, of which the following is a specification.

This invention relates to trolley collector devices, and pertains especially to collectors suitable for pantograph or scissor constructions.

It is an object of this invention to provide a collector in which the trolley wire will not wear a groove. Heretofore in trolleys employing a roller or sliding bow the trolley wire has worn a groove in the collector at the position which is normally in contact with the wire. Such grooves are objectionable when the trolley reaches a curve or switch, involving an off-center displacement of the wire. At such places the wire tends to remain in the groove placing a strain on the wire, and its suspension. When the strain is sufficient to snap the wire from the groove, a further strain occurs on the trolley collector mounting and on the trolley wire suspension.

Our invention obviates this difficulty and also increases the life of the collector.

An embodiment of our invention is illustrated in the accompanying drawing, in which:

Figure 1 is a side elevation of the top of a trolley car having our improved trolley mounted thereon.

Fig. 2 is an enlarged plan view of our improved trolley.

Fig. 3 is a vertical section through the collector and its mounting.

Referring more particularly to the drawing, A indicates a trolley car upon which are mounted pantograph trolleys B, one at each end thereof. Pantograph trolleys B are equipped with our improved collector C which contacts with the trolley wire D. The pantograph is any of the usual types, and has a cross bar 4. Cross bar 4 is provided at its center with a vertically extending bearing 5 which is preferably cast integral with the bar 4.

Mounted in the bearing 5 is a pintle 6 which is preferably formed integral with the collector C. A thrust shoulder 7 is formed adjacent the collector disk, pintle 6 is threaded, and a nut 8 mounted thereon with a washer 9 interposed between the bearing and the nut. This construction is such that the pintle 6 may rotate with respect to the cross bar and the thrust on the pintle will be taken care of by the shoulder 7 and nut 8. The collector C comprises a disk 10 which is preferably dished.

In the operation of the trolley the dished collector disk will cause the trolley wire D to slip to one side, and in the movement of the collector along the wire the disk will rotate. The disk is compelled to rotate immediately that the wire becomes displaced from the center. The wire D will not remain at the center of the collector disk due to the curvature of the disk and the action tending to force the wire outwardly on rotation of the disk. The disk rolls along the wire so that there is no tendency to groove the disk. When a curve or switch is reached the wire can move off center with respect to the disk.

It will be noted that a relatively large contact surface is offered between the wire and disk, thereby decreasing the resistance to the flow of current from the trolley wire to the disk. It is obvious that because of the large surface which contacts with the trolley wire, the wear on the disk is materially decreased as compared to the roller or sliding bow construction. Furthermore the sliding action of the wire on the disk keeps the contact surface clean.

What we claim is:

1. In a trolley collector, the combination of a suitable collector mounting attached to the top of a car, and a collector disk revolubly mounted thereon, the upper surface of said disk adapted to engage a trolley wire and rotate on a movement of the trolley car, the entire upper surface of said disk presenting a surface free from projections, whereby the wear on the contact surface of said collector disk will be evenly distributed over the entire surface.

2. In an overhead trolley collector, the combination of a suitable collector mounting, of a collector disk having a convexed outer surface mounted thereon and adapted to engage a trolley wire and rotate on a movement of the car, the entire upper surface of said disk presenting a surface free from projections, whereby the wear upon the entire upper convexed surface of the disk will be evenly distributed.

3. In an overhead trolley collector, the combination of a suitable collector mounting, of a collector disk having a convexed outer surface, and a vertically disposed pintle secured to the under face of said disk, said pintle being rotatably connected on said collector mounting.

In witness that we claim the foregoing we have hereunto subscribed our names this 21st day of December, 1916.

DE WITT W. BISBEE.
PETER AMES CRESSEY.